(12) United States Patent
Papenfuss et al.

(10) Patent No.: US 6,465,751 B2
(45) Date of Patent: Oct. 15, 2002

(54) CANCELING DEVICE FOR A BLINKER SWITCH IN MOTOR VEHICLES

(75) Inventors: Jürgen Papenfuss, Sachsenheim (DE); Otto Machalitzky, Bietigheim-Bissingen (DE); Walter Hecht, Bietigheim-Bissingen (DE)

(73) Assignee: Valeo Schalter und Sensoren GmbH, Bietigheim-Bissingen (DE)

( * ) Notice: Subject to any disclaimer, the term of this patent is extended or adjusted under 35 U.S.C. 154(b) by 0 days.

(21) Appl. No.: 09/912,330

(22) Filed: Jul. 26, 2001

(65) Prior Publication Data

US 2002/0017448 A1 Feb. 14, 2002

(30) Foreign Application Priority Data

Aug. 2, 2000 (DE) .......................................... 100 37 586

(51) Int. Cl.[7] .................................................. H01H 3/16
(52) U.S. Cl. .................................... 200/61.3; 200/61.27
(58) Field of Search ............ 200/4, 17 R, 61.27–61.35, 200/61.54

(56) References Cited

U.S. PATENT DOCUMENTS

| | | | | |
|---|---|---|---|---|
| 4,855,542 A | * | 8/1989 | Furuhashi et al. ....... | 200/61.27 |
| 5,030,802 A | * | 7/1991 | Noro ........................ | 200/61.27 |
| 5,196,662 A | * | 3/1993 | Hofmann .................. | 200/61.54 |
| 5,313,028 A | * | 5/1994 | DuRocher ................ | 200/61.27 |
| 5,406,253 A | * | 4/1995 | Doke et al. .............. | 200/61.27 |
| 5,672,855 A | * | 9/1997 | Uchiyama et al. ......... | 200/61.3 |
| 6,186,022 B1 | * | 2/2001 | Ishikawa ................... | 200/61.3 |

* cited by examiner

*Primary Examiner*—Michael Friedhofer
(74) *Attorney, Agent, or Firm*—Paul Vincent

(57) ABSTRACT

A canceling device (10) for a blinker switch in motor vehicles effects automatic return of the blinker switch from one of the two switched positions into the neutral central position. Towards this end, a casing (12) having a catch profile (14) is provided as is a movable pretensioned trigger finger (16) which can be loaded by the cam (128) of a steering shaft (44) and with a pivotable switching part (26) having pretensioned catch elements (62,64). To reduce the actuating forces, the catch profile (14) is provided with a movable locking section (54,56). The trigger finger (16) should be connected to the movable locking section (54,56) such that the locking section (54,56) releases the catch element (62,64) when the trigger finger (16) is actuated.

23 Claims, 9 Drawing Sheets

CANCELING DEVICE FOR A BLINKER SWITCH IN MOTOR VEHICLES

This application claims Paris Convention priority of DE 100 37 586.3 filed Aug. 2, 2000 the entire disclosure of which is hereby incorporated by reference

BACKGROUND OF THE INVENTION

The present invention concerns a canceling device for a blinker switch in motor vehicles which effects automatic canceling of the blinker switch from one of the two switched positions into the neutral central position, comprising a casing with at least one catch profile, and having a movable pretensioned trigger finger which is disposed in the switched positions such that it can be actuated by a cam connected to a steering shaft, and comprising a switching piece which is pivotable and equipped with at least one pretensioned catch element engaging in the catch profile.

A canceling device of this type has been commercially available. When the blinker switch is switched on, the switching piece releases the trigger finger which is caused, due to its pretension, to move radially inward towards the steering shaft and projects into a circular path of the cam connected to the steering shaft. The switching piece is held in the switched position by a pretensioned catch element engaging in a depression of the catch profile.

When, during a corresponding turning motion of the steering wheel, the cam connected to the steering shaft is moved past the trigger finger, the trigger finger is pivoted sidewardly. Carrier surfaces provided on the trigger finger thereby engage a shoulder of the catch element to pull same, in opposition to its direction of pretension, out of the depression in the catch profile. The switching piece together with the blinker switch can thereby snap back into their neutral central positions.

The forces required for actuating the trigger finger in the known canceling device are relatively large. This does not provide a problem for the user turning the steering wheel, who cannot feel this force due to the very favorable lever conditions. The large forces which occur during actuation cause, however, different problems: In many modern vehicles, a steering angle sensor is also disposed in the region of the canceling device which is used for electronic determination of the steering angle. The signals provided by the steering angle sensor are used e.g. by an electronic stabilization device for the vehicle. The reliability of the signals provided by the steering angle sensor is therefore very important. To reduce the amount of space needed and the number of required parts, the canceling device for the blinker switch and the steering angle sensor are often mounted to a common support.

The large forces which occur at the canceling device during its actuation can deform the support to which the canceling device and the steering angle sensor are mounted. These deformations falsify the signals provided by the steering angle sensor.

It is therefore the underlying purpose of the present invention to further develop a canceling device of the above-mentioned type such that the forces produced during actuation of the trigger finger are reduced.

SUMMARY OF THE INVENTION

This object is achieved in a canceling device of the above-mentioned type in that the catch profile has at least one movable locking section and the trigger finger is connected to the movable locking section such that the locking section releases the catch element when the trigger finger is actuated.

In accordance with the invention, for automatic canceling of the blinker switch, the catch element is not returned in opposition to the pretensioning force but rather the path which the catch element must follow between the switched position to the neutral central position "is cleared". The forces which are required for moving the locking section are much smaller than those of prior art which were required to move the catch element in opposition to the spring force. In theory, only the frictional force between the locking section and the catch element must be overcome. For this reason, the deformations to which the canceling device and the carrier connected therewith are subjected during actuation from one of the two switched positions into the neutral central position are very small which considerably improves the measuring accuracy of a steering angle sensor disposed on the same carrier.

Advantageous embodiments of the invention are given in the dependent claims.

A locking section which is easy to realize is formed in a further development of the invention on a part which can be pivoted like a door. Alternatively, the locking section can also be formed on a linearly displaceable part.

A deflecting element can preferably be provided to transfer the actuating motion of the trigger finger to the locking section. A deflecting element of this type can convert the direction of motion of the trigger finger in a simple fashion such that the locking section can be moved in any direction required e.g. by installation considerations. In addition, such a deflecting element permits realization of various lever arms for changing forces or stroke lengths.

In a preferred further development of the inventive canceling device, the deflecting element comprises a slot in the region facing the locking section whose longitudinal axis is disposed at an angle with respect to the direction of motion of the locking section, wherein the locking section is connected to a pin which engages the slot. The movement of such a deflecting element can be transformed into a motion of the locking section in a simple fashion.

A further development is particularly preferred wherein the locking section is kinematically locked in its locked position. This type of kinematic locking can be effected without a spring element, the load of which would have to be overcome during motion of the locking section. With such a restoring device, the movement of the locking section into a position in which the catch element is released requires very little force.

An example of such kinematic locking of the locking section is effected when the longitudinal axis of the slot is bent and the longitudinal axis of that region of the slot containing the pin of the locking section in the neutral central position is substantially at right angles with respect to a radius line intersecting the axis of rotation of the deflecting element and that region.

When the blinker switch is in the neutral central position, the locking section is in a position in which the catch element is arrested in its central position. In this neutral central position, the described geometrical arrangement allows the locking section to only transfer forces to the deflecting element whose line of action passes through the axis of rotation of the deflecting element. The corresponding lever arm is equal to zero such that loading of the locking section does not move the deflecting element and the locking section remains locked. Only a motion of the deflecting element moves the pin of the locking section into the other region of the slot in which the mechanism is unlocked.

An alternative to the angled slot is given in a further development, wherein the deflecting element comprises a stepped slot in its section facing the locking section into which a pin, connected to the locking section, engages. Such an embodiment is particularly preferred when the locking section is formed on a linearly displaceable part.

The inventive canceling device can comprise at least one tensioning element which loads the deflecting element into its neutral central position. In connection with a purely kinematic locking of the locking section, the force required for actuating the trigger finger is substantially given by the tensioning force of this tensioning element. Since this can be very small, the required actuating force is also correspondingly small.

The tensioning element can thereby comprise a helical pressure spring whose one end is received in a sleeve having a closed end which is rounded or semi-spherical, wherein the closed end of the sleeve is preferably received in a corresponding depression in the casing. In this further development, the helical pressure spring can be oriented in correspondence with the position of the deflecting element. The depression is thereby preferably also rounded and dimensioned such that a corresponding pivoting motion of the sleeve and simultaneously of the helical pressure spring is possible.

To improve engagement of the tensioning element on the deflecting element, the invention also provides the deflecting element with a pin-like shoulder which the tensioning element surrounds at its free end, or a recess into which the tensioning element engages.

To secure the trigger finger against tilting, the trigger finger can be further provided with at least one supporting wing for support on the deflecting element.

In a further development of the invention, the casing comprises a wall element which is provided with a guiding slot which extends parallel to the longitudinal axis of the trigger finger, into which a guiding pin of the trigger finger engages and/or at least one guiding slot into which a guiding pin engages which is disposed on a section of the deflecting element. Such guiding slots guide the trigger finger and/or the deflecting element to ensure even more accurate motion of the corresponding elements.

The guiding slot can thereby constitute a stop for the path of motion of the trigger finger or of the deflecting lever. Such a stop can e.g. delimit the maximum linear motion of the trigger finger out of the casing. The final positions of the deflecting lever can likewise be defined in a simple fashion.

The forces which are required to move the switching piece from its neutral central position into one of the switched positions, can be reduced if the catch element comprises a rotatable roller on its end facing the catch profile. It is, of course, also possible to provide a ball-shaped or a similar element instead of a roller, which turns along the catch profile, with little friction, during motion of the catch elements. The wear on the catch profile and on the catch element in the region of the contact surfaces is thereby also reduced.

The catch profile can furthermore comprise a canceling section having a step which must be overcome when actuating the catch element into the switched position. Such a step produces a defined engaged position which the user can feel when engaging the blinker switch.

One further development of the invention is particularly preferred, wherein the locking section comprises a rounded and/or flattened locking edge. A locking edge of this type produces a defined contact point between the catch element and the locking section in the switched position of the indicating switch, i.e. when the catch element is locked by the locking section.

In accordance with the invention, the trigger finger can abut a pretensioned intermediate part and have a projection in the contacting area which engages with play behind a recess in the intermediate part. This permits pre-mounting and pre-tensioning of the intermediate part on the trigger finger without having it rotate out of the mounted position in response to pre-tensioning. This considerably simplifies installation of the canceling device.

A further similar development provides that the locking section is connected to a mushroom-like shoulder which engages with play in a corresponding recess in the casing. This mushroom-like shoulder facilitates assembly in that the locking section can be pre-mounted on the casing such that it cannot drop out during assembly of the other parts.

Finally, it is particularly advantageous when the trigger finger comprises a control body having a substantially square overall contour. Such an actuation section permits a maximum path of motion for the loaded part, in particular of a deflecting element with which the control body cooperates.

Two embodiments of the invention are described in detail below with reference to the accompanying drawing.

DESCRIPTION OF THE PREFERRED EMBODIMENT

Figure 1:
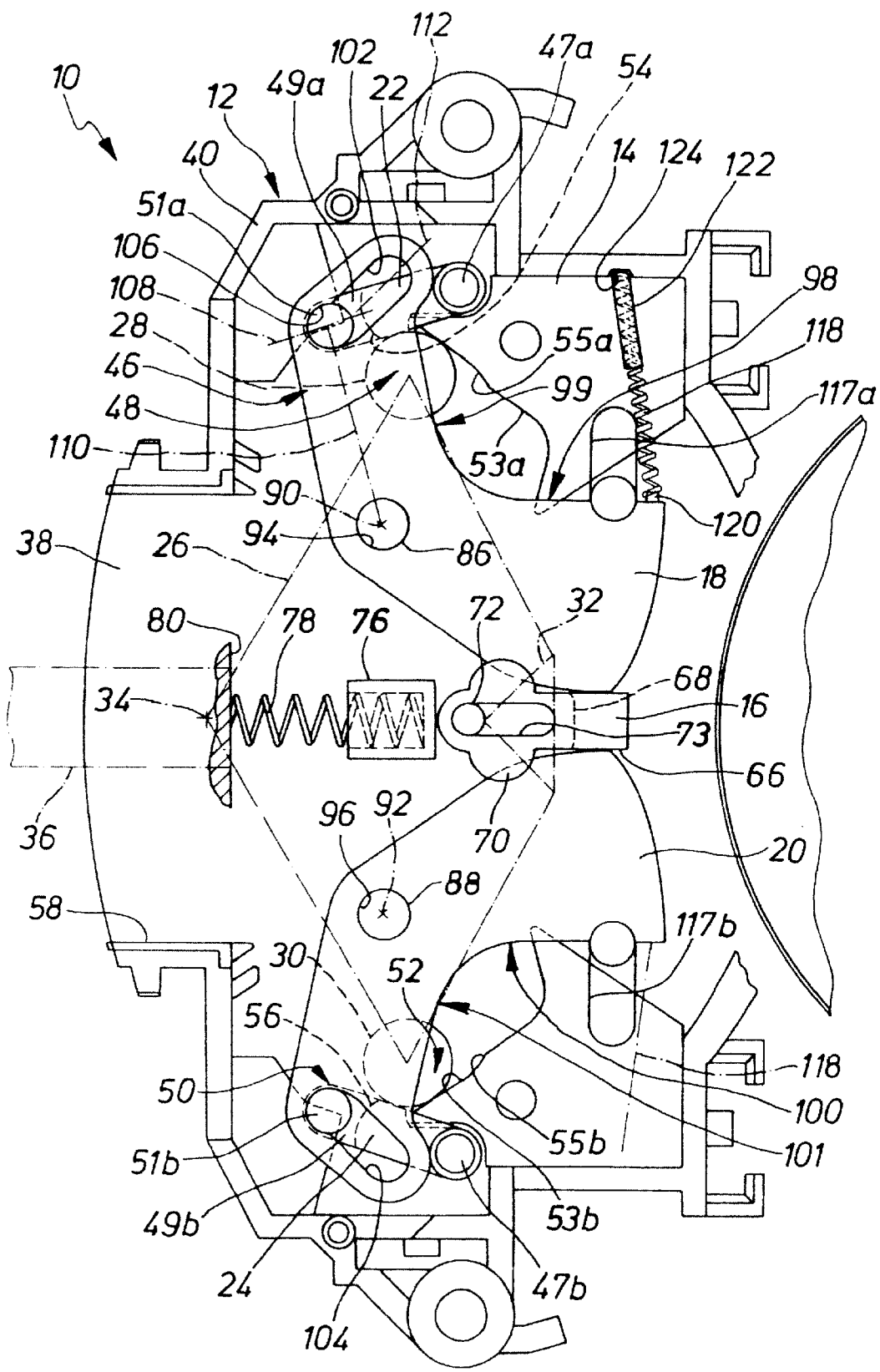
FIG. 1 shows a plan view of a first embodiment of a canceling device, in its neutral central position.

The overall canceling device for a blinker switch in an motor vehicle is designated with the reference numeral 10 in FIG. 1. It comprises a casing part 12 with a catch profile insert 14, a trigger finger 16, two deflecting elements 18 and 20, two locking doors 22 and 24 and one switching piece 26 of which only the rollers 28 and 30, the catch elements, a triangular locking part 32, and a point of rotation 34 are shown for reasons of clarity. The switching piece 26 is only symbolically indicated by dash-dotted lines interconnecting the rollers 28 and 30, the triangular locking part 32, and the point of rotation 34. A blinker switch, also only indicated with dash-dotted lines, has been designated by reference numeral 36.

Figure 6:
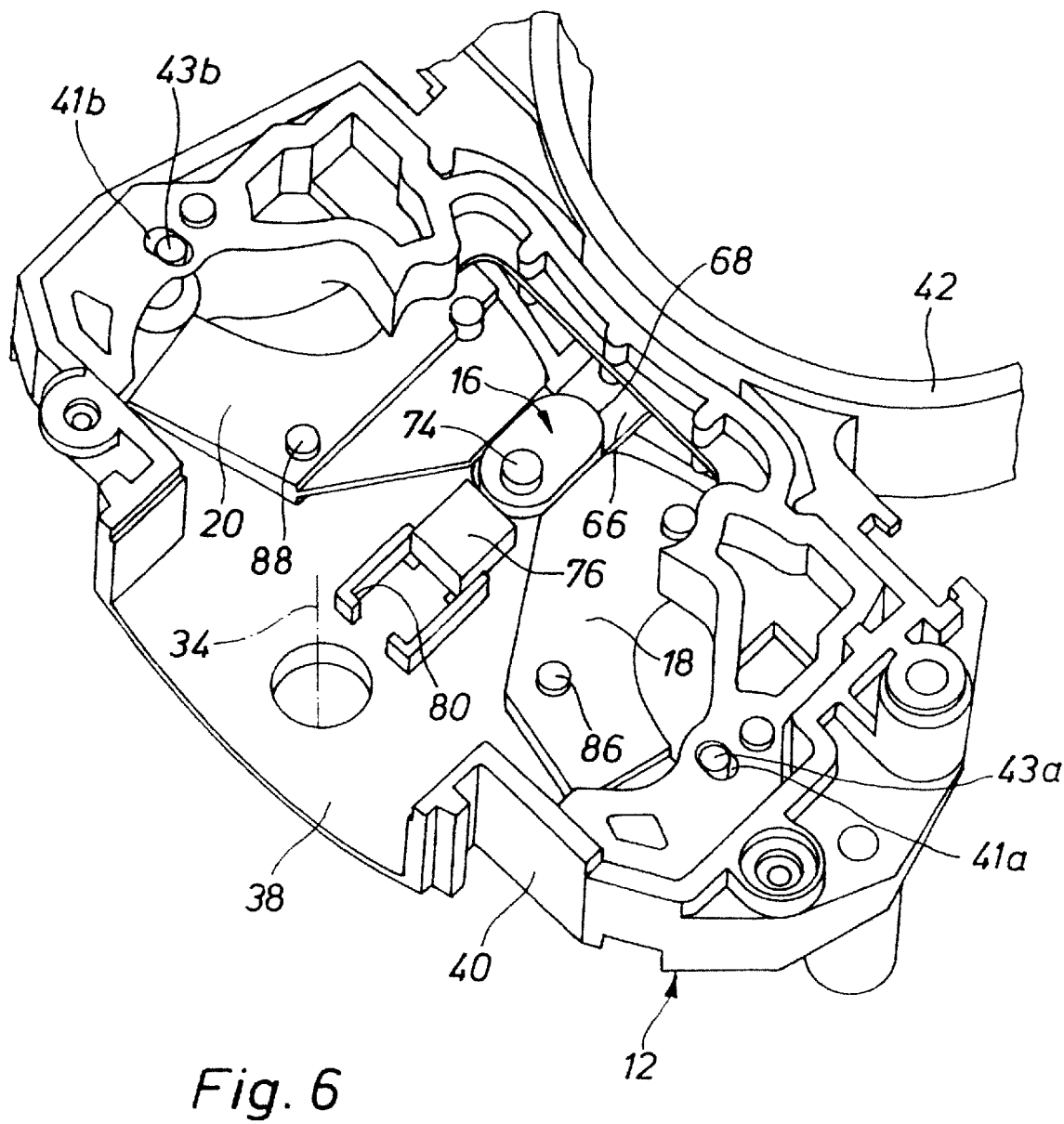
FIG. 6 shows a perspective view of some components of the canceling device of FIG. 1, in the assembled state.
Figure 8:
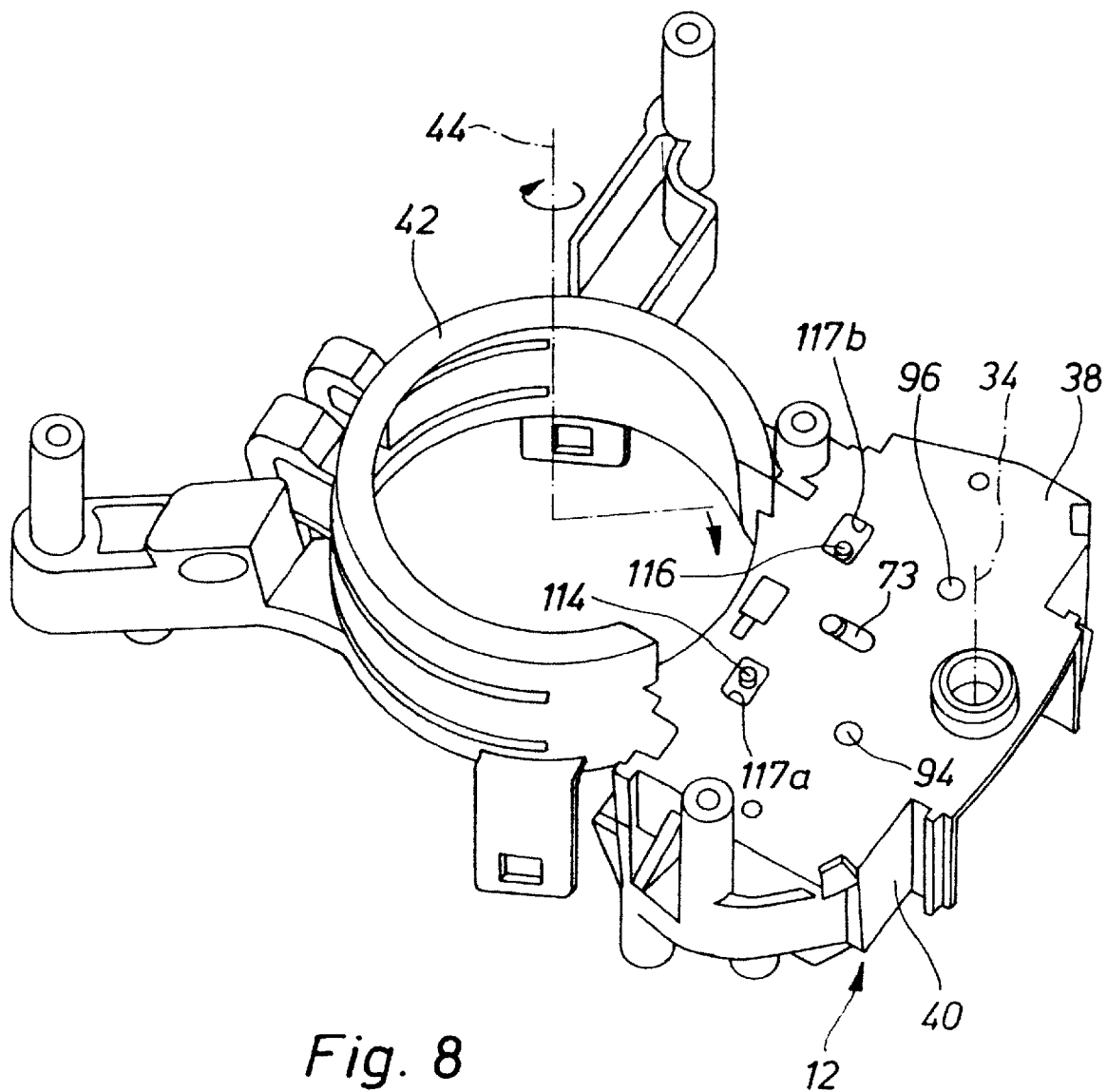
FIG. 8 shows a perspective view from below of several casing parts of the canceling device of FIG. 1.

The casing part 12 comprises a bottom 38 (transparent in FIG. 1) and a wall 40 extending perpendicular thereto. FIG. 8 shows the bottom in detail. A collar-like support 42 is also formed on the wall 40 and disposed coaxially with respect to an axis of a steering shaft (only shown with dash-dotted lines: see, in particular, FIGS. 6 and 8).

Figure 5:
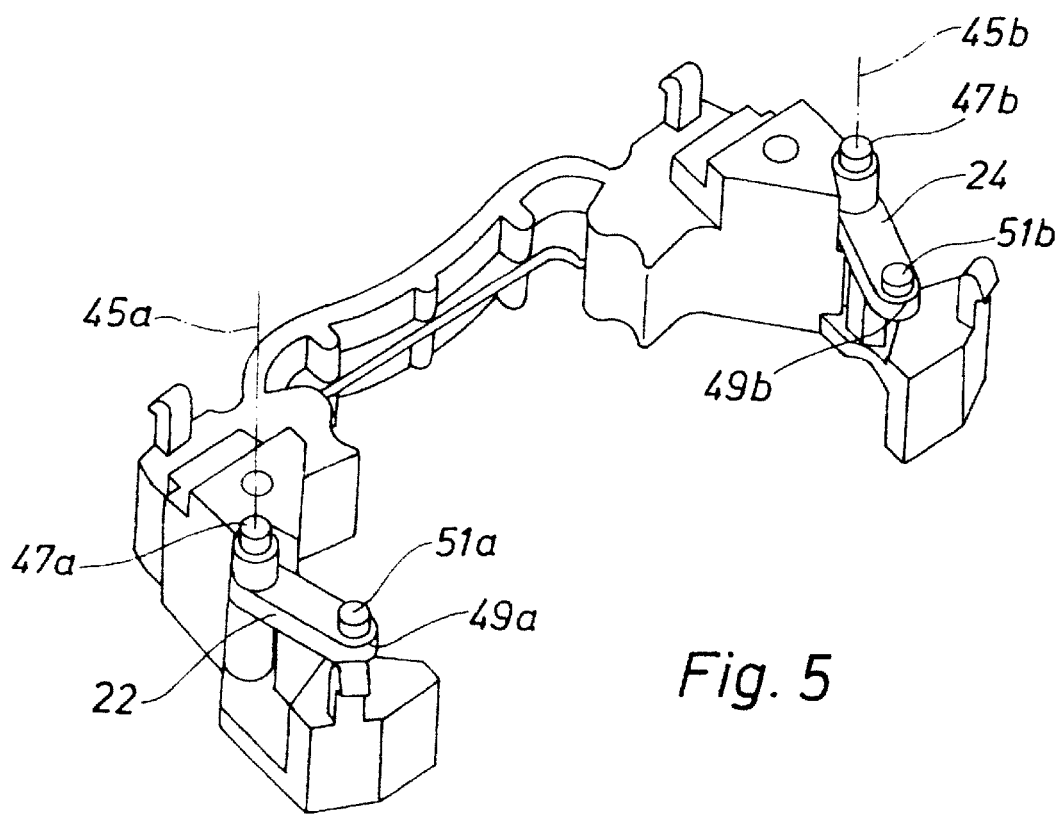
FIG. 5 shows a perspective view of a casing part with a catch profile, and two locking sections of the canceling device of FIG. 1.

The catch profile insert 14 is inserted into the casing part 12 within the wall 40. Its exact design is shown in FIG. 5. The locking doors 22 and 24 are disposed in a recess of the catch profile insert 14 and pivot about axes 45a and 45b via lower pivot pins (not shown in the drawing) in corresponding recesses of the catch profile insert 14. The visible upper pivot pins 47a and 47b engage in corresponding recesses (without reference numerals) in the bottom 38. Each locking door 22 or 24 bears, on each lever arm 49a or 49b, a control pin 51a or 51b which cooperates with the deflecting element 18 or 20 in a fashion which will be explained below. To secure the locking doors 22, 24 from falling out during mounting, a mushroom-like shoulder 43a, 43b is formed on their lower side which engages with some play behind a corresponding longitudinal recess 41a, 41b in the catch profile insert 14 (see FIG. 6).

In the position of the locking doors 22 and 24 shown in FIGS. 1 and 5, two upper catch depressions 46 and 48 or two lower catch depressions 50 and 52 are formed in the catch profile insert 14. The locking doors 22 and 24 bear a locking section 54 or 56, parallel to their respective pivot axis, which separates corresponding catch depressions 46 and 48 or 50 and 52 from each other. The catch profile insert furthermore comprises two canceling sections 53a and 53b, each with one step 55a, 55b.

Figure 7:
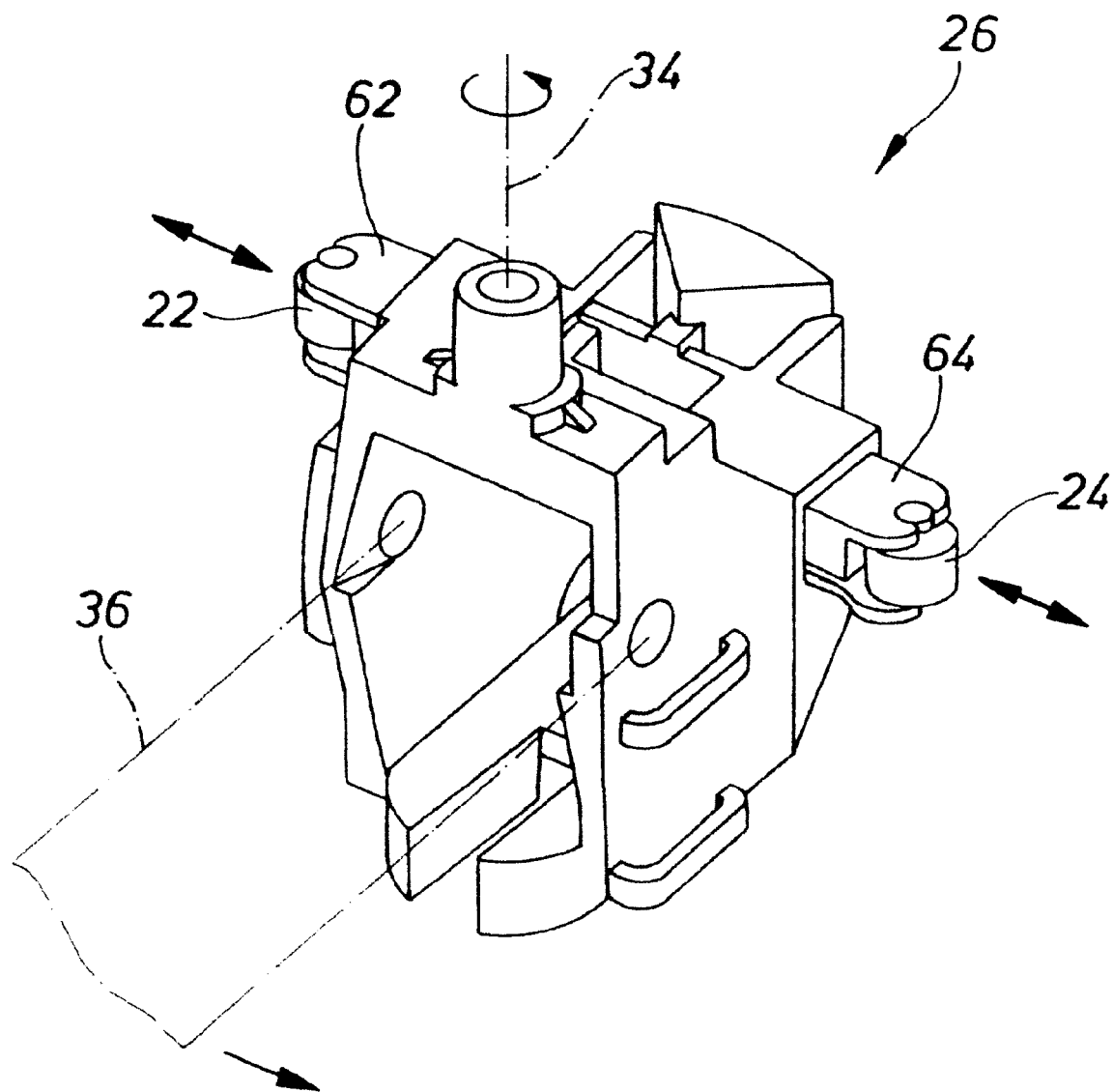
FIG. 7 shows a perspective view of a switching piece of the canceling device of FIG. 1.

As seen on the left-hand side of FIG. 1, the casing part 12 has an opening 58 through which the blinker lever 36 passes. While the switching piece 26 and the corresponding catch elements are indicated only symbolically by a dash-dotted line in FIGS. 1 through 3, the exact design of the switching piece 26 can be extracted from FIG. 7. This figure also shows the catch elements 62 and 64 which are guided in the switching piece 26. In the neutral central position shown in FIG. 1, the catch elements 62 and 64 extend downwardly from the center into the catch depression 52 or vertically upwards into the catch depression 46. The radially inner sections of the two catch elements 62 and 64 are hollow and accommodate a helical pressure spring (not shown) by means of which the two rollers 28 and 30 of the catch elements 62 and 64 are loaded against the catch profile insert 14 or the locking doors 22 and 24.

Figure 4:
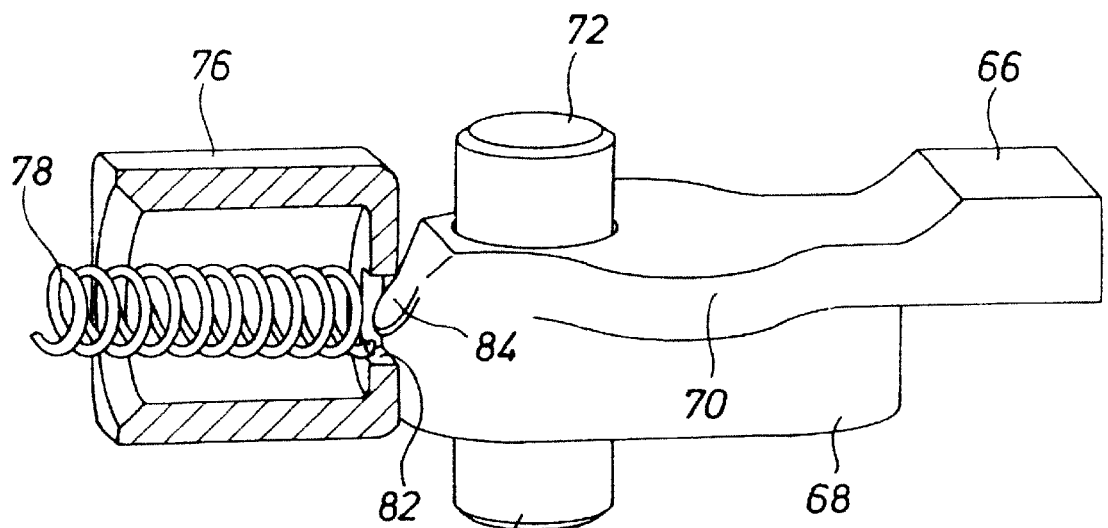
FIG. 4 shows a perspective view of the trigger finger and an intermediate part of the canceling device of FIG. 1.

The trigger finger 16, shown in particular detail in FIG. 4, has a carrier 66 oriented towards the axis 44 of the steering shaft when installed, which is disposed in a retracted state in the central position of the canceling device 10 (FIG. 1). The carrier 66 is formed on a control body 68 which has a substantially longitudinal shape when viewed from the top. Supporting wings 70 are formed on the sides of the control body 68. The side of the control body 68 facing away from the carrier 66 is provided with a guiding pin 72 on its upper side and with a stop pin 74 on its lower side. The guiding pin 72 engages in a guiding slot 73 in the bottom 38 of the casing 12.

The end of the control body 68 facing away from the carrier 66 is rounded and abuts an end face of a cylindrical intermediate part 76. The end of the intermediate part 76 facing away from the trigger finger 16 is open. A helical pressure spring 78 is disposed in the intermediate part 76 and is supported, on one side, on the end of the intermediate part 76 facing the trigger finger 16 and, on the other side, on a supporting element 80 which is fixed to the housing and which is only symbolically shown in the figures. The end face of the intermediate part 76 facing the trigger finger 16 is provided with a recess 82 which engages with play behind a hook-shaped pin 84 formed on the control body 68 which has an insertion slope permitting pre-mounting of the intermediate part 76 on the trigger finger 16 to facilitate installation of the canceling device 10.

The two deflecting elements 18 and 20 each have the shape of a flat elbow lever, each with one first lever section 98 and 100 and a second lever section 99 and 101. A pivot axis 90 and 92 is defined by a pin 86 and 88. The pivot pins 86 and 88 are accommodated in corresponding recesses 94 and 96 in the bottom 38 of the casing part 12 (see FIG. 8).

Each end of the second lever section 99 and 101 of the deflecting element 18 and 20 facing the respective locking door 22 and 24 has a slot 102 and 104, which has two sections, disposed at an angle with respect to each other. The longitudinal axis of that region of the slot 102 and 104, which accommodates the control pin of the locking door 22 and 24 in the neutral central position of the canceling device, 10 (shown in FIGS. 1 and 2) is perpendicular to a radius line intersecting the axis of rotation 90 and 92 of the deflecting element 102 and 104 and that region. FIG. 1 shows the corresponding reference numerals for the upper deflecting element 18 only. The corresponding region of the slot 102 is designated with reference numeral 106, its longitudinal axis is referenced with 108, and the radius line with 110. The other region of the respective slot 102 and 104 is formed such that its longitudinal axis is disposed at an angle with respect to the direction of motion of the respective locking section 54 and 56.

The longitudinal axis of the corresponding region of the upper slot 102 has the reference numeral 112. The control pins 51a and 51b of the locking doors 22 and 24 are slidingly accommodated in the slots 102 and 104. One guiding pin 114 and 116 is formed on the first lever section 98 and 100 proximate the trigger finger 16 and is disposed on a side thereof facing away from the trigger finger 16 to engage with play in corresponding guiding slots 117a, 117b in the bottom 38 of the casing part 12.

A helical pressure spring 118 is tensioned between the first lever section 98 or 100 of the deflecting element 18 or 20 and the upper or lower wall 40 of the casing part 12 which is shown in detail only in the upper region of FIG. 1 and is otherwise indicated by a dash-dotted line. One end of the helical pressure spring 118 surrounds a projection 120 formed on the lever 98. The other end is received in a sleeve 122 whose closed end is rounded. This closed end is received in a depression 124 in the wall 40 of the casing part 12.

The helical pressure spring 118 loads the lever section 98 or 100 towards the trigger finger 16. The guiding slots 117a and 117b are dimensioned and disposed to form a stop, thereby leaving a gap between control body 68 of the trigger finger 16 and the deflecting levers 18 or 20 in the position shown in FIGS. 1 and 2.

Figure 2:
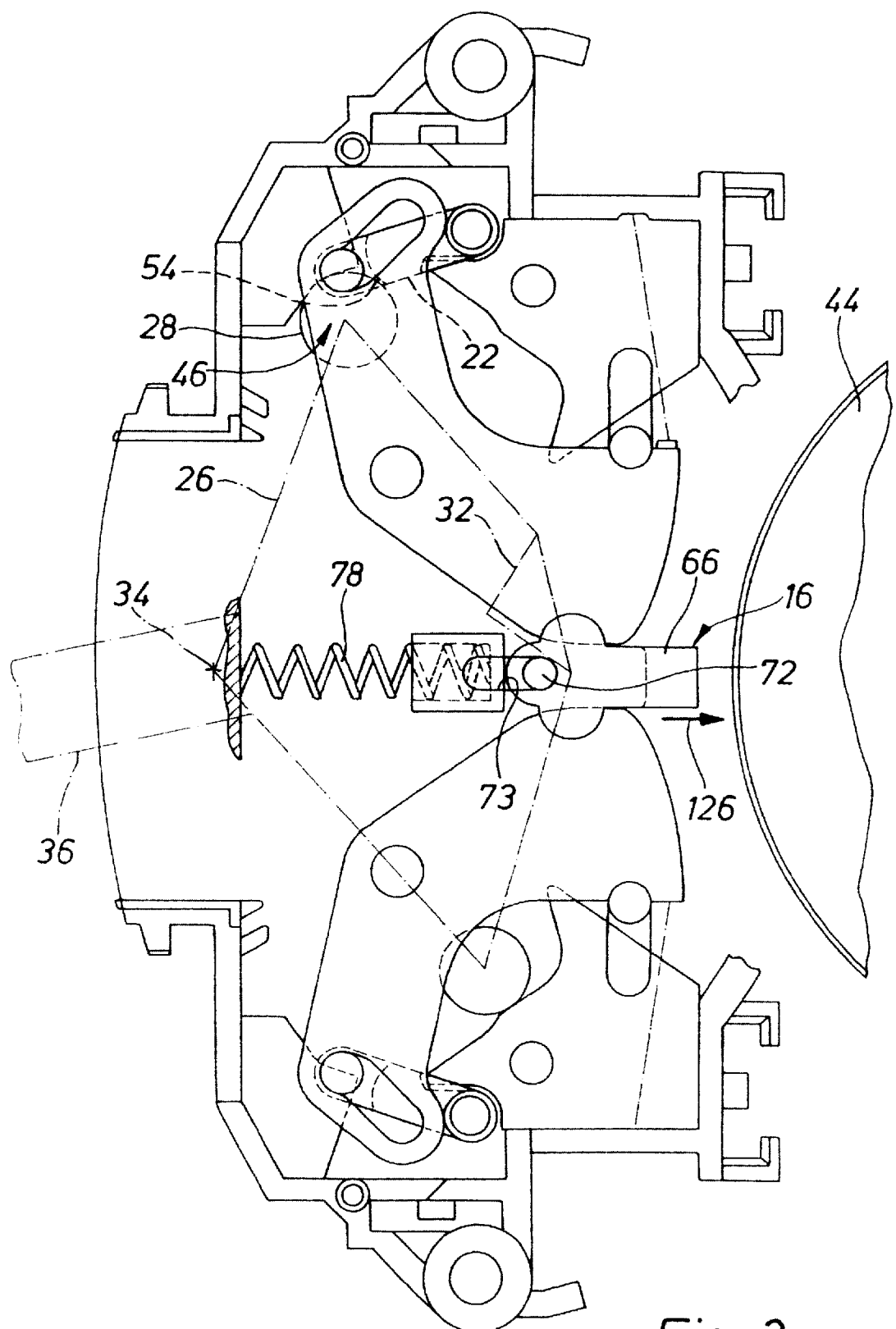
FIG. 2 shows a plan view of the canceling device of FIG. 1 in one of its switched positions.
Figure 3:
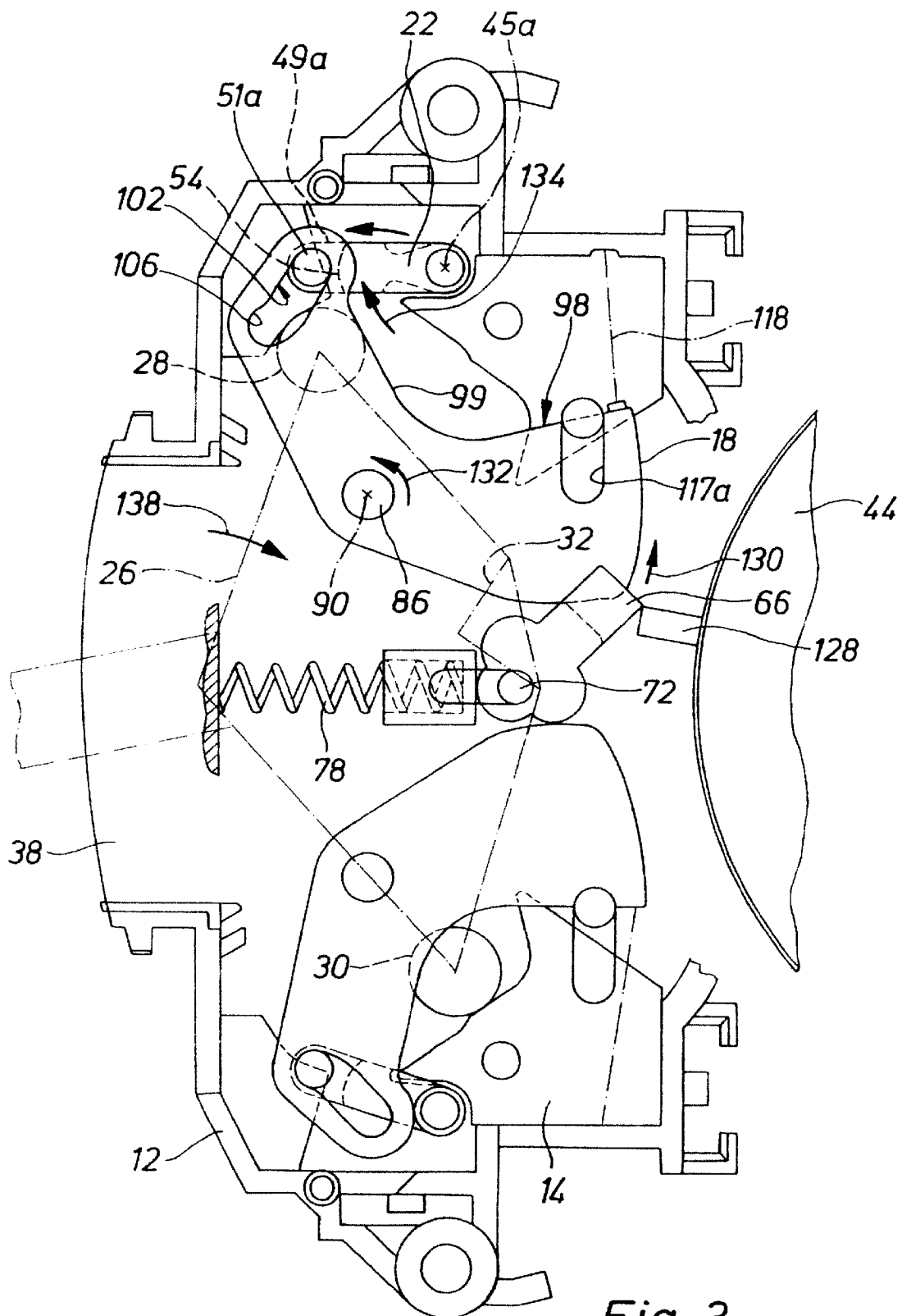
FIG. 3 shows a plan view of the canceling device of FIG. 1 during automatic canceling from the switched position into the neutral central position.

The function of the canceling device 10 is now explained, in particular, with reference to FIGS. 1 through 3.

In the neutral central position shown in FIG. 1, the guiding pins 114 or 116 of the deflecting elements 18 or 20 abut the inner ends of the guiding slots 117a or 117b. The second lever sections 99 or 101 of the deflecting elements 18 and 20 are therefore located in a position proximate to the wall 40 of the casing part 12. The control pins 51a or 51b on the projections 49a or 49b of the locking doors 22 and 24 are located in the locking regions 106 of the two slots 102 and 104. In this position, the two locking doors 22 and 24 are kinematically locked and inwardly pivoted such that the two locking sections 54 and 56 of the locking doors 22 and 24 form an elevated section within the profile contour of the catch profile insert 14.

The two rollers 28 and 30 of the catch elements 62 and 64 lie in the catch inserts 48 or 52 formed in this fashion, thereby locking the blinker lever 36 in the horizontal position shown in FIG. 1. The triangular locking part 32, which is a component of the switching piece 26, is disposed in a central position approximately on the central axis of the opening 58.

The stop pin 74 of the trigger finger 16 abuts the tip of the triangular locking part 32. In this position, the trigger finger 16 is loaded by the helical pressure spring 78 and the intermediate part 76 which abuts the trigger finger 16. The triangular locking part 32 thereby prevents a rightward motion of the trigger finger 16 (in FIG. 1), i.e. towards the steering shaft 44 in response to the direction of loading of the helical pressure spring 78.

When the user presses the blinker lever 36 downwards, the switching piece 26 is also pivoted about the point of rotation 34. The roller 28 of the catch element 62 is thereby moved, via the rising locking door 22, in opposition to the force of the helical pressure spring (not shown) disposed between the two catch elements 62 and 64. When the roller 28 of the catch element 62 has overcome the locking section 54 of the locking door 22, it is pressed, in response to the force of the helical pressure spring, into the catch depression 46 which is delimited on its right-hand side by the locking section 54. This position of the switching part 26 is shown in FIG. 2.

The rotary motion of the switching piece 26 also moves the triangular locking part 32 upwards such that the stop pin 74 of the trigger finger 16 is released from the tip of the triangular locking part 32, and slides along its side surface thereby releasing the trigger finger 16 for motion, in response to the direction of loading of the helical pressure spring 78, in the direction of the arrow 126. This release motion terminates when the guiding pin 72, provided on the trigger finger 16, abuts the right end of the guiding slot 73 in the bottom 38 of the casing part 12 (see FIG. 2). In the position of FIG. 2, the carrier 66 of the trigger finger 16 clearly projects towards the steering shaft 44.

Turning of a steering wheel (not shown in the drawing) produces corresponding turning of the steering shaft 44. A cam 128 is connected to the steering shaft. In response to the rotary motion, the cam 128 pushes the carrier 66 of the trigger finger 16 in the direction of the arrow 130 (see FIG. 3) thereby pivoting the trigger finger 16 about an axis which extends parallel to the axis of the steering shaft 44, as defined by the guiding pin 72. Due to this pivoting motion of the trigger finger 16, the control body 68 presses against the first lever section 98 of the deflecting element 18 thereby pivoting same about the axis of rotation 90 given by the pivot pin 86 and in the direction of the arrow 132, in opposition to the direction of loading of the helical pressure spring 118.

This pivoting motion also produces pivoting of the second lever section 99 of the deflecting element 18 in the direction of the arrow 134. This causes the control pin 51a on the projection 49a of the locking door 22 to slide out of the locking region 106 of the slot 102 and move towards the upper end of the slot 102 (in FIG. 3). The maximum pivoting angle of the deflecting element 18 is delimited by the guiding slot 117a in the bottom 38 of the casing part 12 and by the length of the slot 102.

The sliding motion of the control pin 51a of the locking door 22 in the slot 102 pivots the locking door 22 about the pivot axis 45a until it comes to rest in a substantially horizontal position shown in FIG. 3. In this position, the locking section 54 of the locking door 22 is completely retracted such that the two catch depressions 46 and 48 are no longer present. The roller 28 of the catch element 62 is no longer locked by the locking section 54.

The lower roller 30 of the lower catch element 64 of FIG. 3 is pressed by the helical pressure spring at an inclined angle against the wall of the catch profile insert 14, thereby pivoting the switching piece 26 in the direction of the arrow 138 and back into its original position shown in FIG. 1. The stop pin 74 of the trigger finger 16 is thereby pressed to the left by the side surface of the triangular locking part 32 in opposition to the direction of loading of the helical pressure spring 78 such that the carrier 66 of the trigger finger 16 once more assumes its retracted position.

As soon as the cam 128 releases the carrier 66 of the trigger finger 16, same pivots about the axis given by the guiding pin 72 into its neutral central position (shown in FIG. 1) in response to loading by the helical pressure spring 118 as transferred via the first lever section 98 of the deflecting element 18. The first lever section 98 of the deflecting element 18 and, at the same time, the second lever section 99 provided with the slot 102 perform a corresponding pivoting motion thereby returning the locking door 22 together with the locking section 54 into the position shown in FIG. 1 in which catch depressions 46 and 48 are to the left and right of the locking section 54.

A second embodiment of a canceling device 10 will be explained with reference to FIGS. 9–11. The parts having functions equivalent to the first embodiment have the same reference numerals and may not be described in detail.

Figure 9:
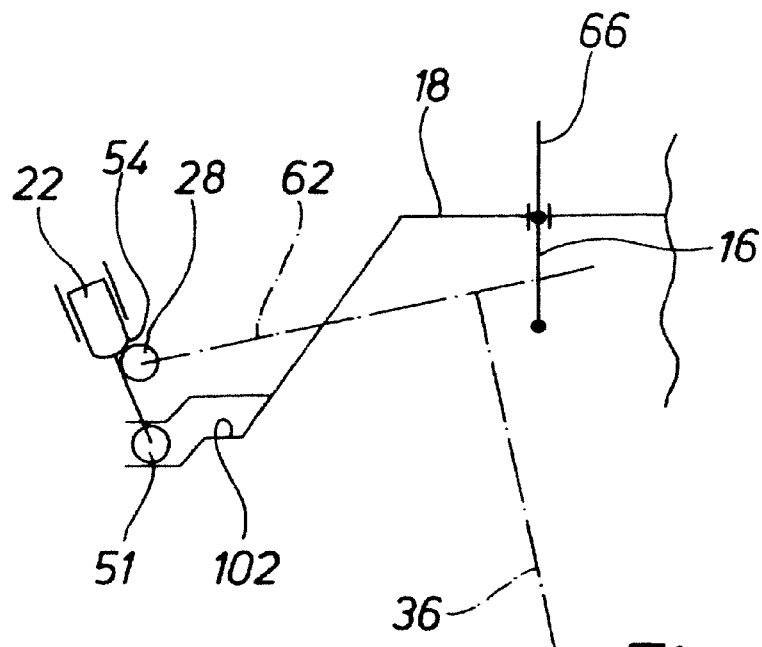
FIG. 9 shows a schematic sketch of a second embodiment of a canceling device, in its neutral central position.
Figure 10:
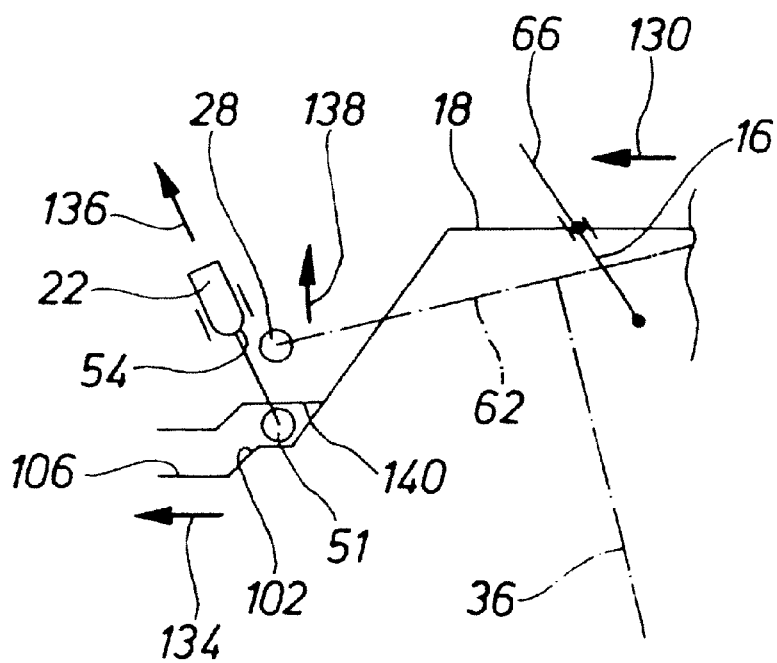
FIG. 10 shows the canceling device of FIG. 9 during automatic canceling from a switched position into the neutral central position.
Figure 11:
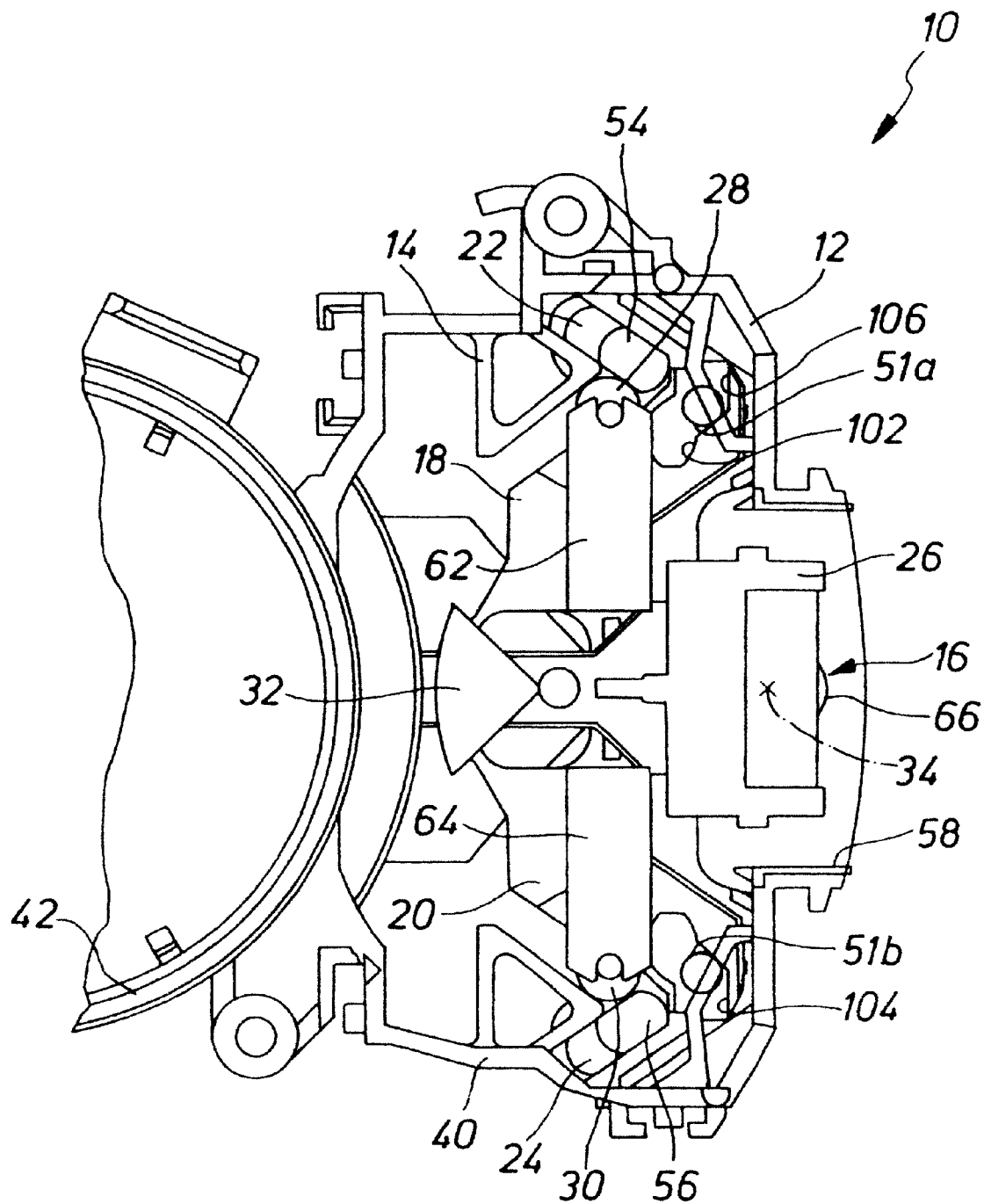
FIG. 11 shows a detailed plan view of the canceling device of FIG. 9.

The two purely schematic representations of FIGS. 9 and 10 show a stepped slot 102 (not a bent one) in the deflecting element 18. A linearly displaceable catch element 22 is provided (instead of a pivotable locking door) and is connected to a control pin which is slidingly accommodated in the stepped slot 102. As shown in FIG. 10, the deflecting element 18 is displaced towards the left in response to loading by the carrier 66 of the trigger finger 16 thereby causing the guiding pin of the catch element 22 to slide in the slot 102 from a locking stage 106 into an opening stage 140. Consequently, the catch element 22 moves in the direction of the arrow 136 thereby releasing the roller 28 of the catch element 62 which permits movement of the roller 28 in the direction of the arrow 138 and return of the blinker lever 36 into its neutral central position shown in FIG. 11.

We claim:

1. A canceling device for a blinker switch in motor vehicles which causes automatic return of the blinker switch from one of two switched positions into a neutral, central position in response to actuation by a cam mounted to a steering shaft, the device comprising:

a casing;

a catch profile mounted in or integral with said casing, said catch profile having at least one movable locking section;

a switching piece mounted for pivoting in the housing, said switching piece having at least one biased catch element engaging in said catch profile;

a trigger finger, disposed in the housing for actuation by the steering shaft cam in switched positions; and means for connecting said trigger finger to said movable locking section to release said catch element when said trigger finger is actuated by the cam.

2. The canceling device of claim 1, wherein said locking section is defined by a pivotable door member.

3. The canceling device of claim 2, wherein said pivotable door member comprises a mushroom-like shoulder which engages with some play behind a cooperating recess in said casing.

4. The canceling device of claim 1, wherein said locking section is formed and disposed for linear displacement thereof.

5. The canceling device of claim 1, wherein said connecting means comprise at least one deflecting element which transfers an actuating motion of said trigger finger to said locking section.

6. The canceling device of claim 5, wherein said deflecting element has a slot in a region facing said locking section, said slot having a longitudinal axis disposed at an angle with respect to a direction of motion of said locking section, wherein said locking section communicates with a pin which engages said slot.

7. The canceling device of claim 6, wherein said slot is bent and a first longitudinal axis of a first region of said slot bearing said pin of said locking section in a neutral central position of the canceling device is substantially perpendicular to a radius line which intersects an axis of rotation of said deflecting element and passes through said pin in said neutral position.

8. The canceling device of claim 6, wherein said slot is a stepped slot.

9. The canceling device of claim 8, further comprising at least one tensioning element which loads said deflection element into a neutral central position thereof.

10. The canceling device of claim 9, wherein said tensioning element comprises a helical pressure spring whose one end is accommodated in a sleeve having a rounded closed end.

11. The canceling device of claim 10, wherein said closed end of said sleeve is accommodated in a corresponding depression in said casing.

12. The canceling device of claim 9, wherein said deflecting element has one of a pin-like projection surrounded by a free end of said tensioning element and a recess into which said tensioning element engages.

13. The canceling device of claim 4, wherein said trigger finger comprises at least one supporting wing for cooperation with said deflecting element.

14. The canceling device of claim 1, wherein said locking section is kinematically locked in a locked position thereof.

15. The canceling device of claim 1, wherein said casing comprises a wall element having a first guiding slot extending parallel to a longitudinal axis of said trigger finger, into which a first guiding pin of said trigger finger engages.

16. The canceling device of claim 15, wherein said first guiding slot defines a stop for a path of motion of said trigger finger.

17. The canceling device of claim 15, wherein said second guiding slot defines a stop for a path of motion of said deflecting lever.

18. The canceling device of claim 1, wherein said casing has at least one second guiding slot into which a second guiding pin engages which is disposed on a section of said deflecting element.

19. The canceling device of claim 1, wherein said catch element comprises a rotatable roller on an end facing said catch profile.

20. The canceling device of claim 1, wherein said catch profile has a canceling section provided with a step which must be overcome during actuation into a switched position of said catch element.

21. The canceling device of claim 1, wherein said locking section has one of a rounded and flattened locking edge.

22. The canceling device of claim 1, wherein the blinker switch is manually activated by a user operating a blinker lever and further comprising a pretensioned intermediate part disposed between and cooperating with the blinker lever and said trigger finger, said trigger finger having a projection which engages with play behind a recess in said intermediate part.

23. The canceling device of claim 1, wherein said trigger finger has a control body with an overall substantially square outer contour.

* * * * *